United States Patent
Sikka et al.

(10) Patent No.: US 11,610,134 B2
(45) Date of Patent: Mar. 21, 2023

(54) TECHNIQUES FOR DEFINING AND EXECUTING PROGRAM CODE SPECIFYING NEURAL NETWORK ARCHITECTURES

(71) Applicant: VIANAI SYSTEMS, INC., Palo Alto, CA (US)

(72) Inventors: Vishal Inder Sikka, Los Altos, CA (US); Daniel James Amelang, San Diego, CA (US)

(73) Assignee: VIANAI SYSTEMS, INC., Palo Alto, CA (US)

( * ) Notice: Subject to any disclaimer, the term of this patent is extended or adjusted under 35 U.S.C. 154(b) by 575 days.

(21) Appl. No.: 16/505,525

(22) Filed: Jul. 8, 2019

(65) Prior Publication Data
US 2021/0012206 A1    Jan. 14, 2021

(51) Int. Cl.
*G06N 3/02* (2006.01)
*G06N 3/10* (2006.01)
(Continued)

(52) U.S. Cl.
CPC .......... *G06N 3/10* (2013.01); *G06N 3/04* (2013.01); *G06N 3/08* (2013.01)

(58) Field of Classification Search
CPC ......... G06N 3/02–04; G06N 3/08–086; G06N 20/00; G06F 8/30–31; G06F 8/41; G06F 8/49
(Continued)

(56) References Cited

U.S. PATENT DOCUMENTS

| 2008/0282238 A1* | 11/2008 | Meijer | G06F 8/437 717/162 |
| 2017/0213131 A1* | 7/2017 | Hammond | G06F 8/31 |

(Continued)

FOREIGN PATENT DOCUMENTS

| JP | H01-180636 A | 7/1989 |
| JP | H08-166934 A | 6/1996 |

(Continued)

OTHER PUBLICATIONS

Vikas Solegaonkar, "Lazy Execution", 2019, retrieved from: https://solegaonkar.github.io/tfLazyExecution.html.*

Julika Vijay, "Getting Started with TensorFlow", May 3, 2020, retrieved from: https://medium.com/analytics-vidhya/getting-started-with-tensorflow-9b06d5382004.*

(Continued)

*Primary Examiner* — Jue Louie
(74) *Attorney, Agent, or Firm* — Artegis Law Group, LLP

(57) ABSTRACT

An artificial intelligence (AI) design application that exposes various tools to a user for generating, analyzing, evaluating, and describing neural networks. The AI design application includes a network generator that generates and/or updates program code that defines a neural network based on user interactions with a graphical depiction of the network architecture. The network generator enables a developer to define the neural network architecture using a pipeline of mathematical expressions that can be directly compiled without the need of a complex software stack. The compilation process allows for the variables to be learned during the training process to be left unassigned when the neural network is instantiated. In particular, the compiler identifies such unassigned variables as variables having values that will be determined during the training process.

20 Claims, 7 Drawing Sheets

(51) Int. Cl.
  *G06N 3/04* (2023.01)
  *G06N 3/08* (2023.01)
(58) Field of Classification Search
  USPC .................. 706/12, 15, 16, 26–32; 717/114, 717/140–141
  See application file for complete search history.

(56) References Cited

U.S. PATENT DOCUMENTS

| | | | |
|---|---|---|---|
| 2018/0314945 A1 | 11/2018 | Breternitz et al. | |
| 2020/0184494 A1* | 6/2020 | Joseph | G06Q 10/04 |
| 2020/0226496 A1* | 7/2020 | Basu | G06N 20/00 |
| 2020/0265301 A1* | 8/2020 | Burger | G06N 3/0481 |
| 2020/0380374 A1* | 12/2020 | Foret | G06N 3/0481 |

FOREIGN PATENT DOCUMENTS

| | | |
|---|---|---|
| JP | 2018-014060 A | 1/2018 |
| WO | 99/12085 A2 | 3/1999 |
| WO | 2015/175734 A1 | 11/2015 |
| WO | 2019/102984 A1 | 5/2019 |

OTHER PUBLICATIONS

Eric Lippert, "What is late binding?", Fabulous adventures in coding, Feb. 2012, retrieved from: https://ericlippert.com/2012/02/06/what-is-late-binding/.*
Amelang, The Nile Programming Language: Declarative Stream Processing for Media Applications, https://raw.githubusercontent.com/wiki/damelang/nile/socal.pdf, 29 pages.
International Search Report for application No. PCT/US2020/040929 dated Oct. 9, 2020.
Rotem et al., "Glow: Graph Lowering Compiler Techniques for Neural Networks", arxiv.org, Cornell University Library, XP081201998, arxiv:1805.00907v3, Apr. 3, 2019, pp. 1-12.
Thielke et al., "A JIT Compiler for Neural Network Inference", 12th European Conference on Computer Vision, ECCV 2012, XP055734005, ISSN: 0302-9743, ISBN: 978-3-319-23527-1, DOI:10.1007/978-3-030-35699-6_36, vol. 11531, Jun. 13, 2019, pp. 448-456.
Zhao et al., "DEEPDSL: A Compilation-Based Domain-Specific Language for Deep Learning", arxiv.org. Cornell University Library, XP080740359, arxiv:1701.02284v1, Jan. 9, 2017, pp. 1-11.
Al-Rfou et al., "Theano: A Python framework for fast computation of mathematical expressions", The Theano Development Team, arxiv.org, Cornell University Library, XP080700349, arxiv:1605.02688v1, May 9, 2016, pp. 1-19.

* cited by examiner

CONVOLUTION: $(X \in R^{m \times m \times p}) \to (Y \in R^{n \times n \times q})$
where
$$y_{i,j,k} = (\sum_{t=1}^{r} \sum_{u=1}^{r} \sum_{v=1}^{p} w_{t,u,v,k} a + b_k)^+$$
$W \in R^{r \times r \times p \times q}$
$b \in R^q$
$r, s, z \in Z$
$c = s(i-1) - z + t$
$d = s(j-1) - z + u$
$$a = \begin{cases} x_{c,d,v} & \text{if } 1 \leq c \leq m \text{ and } 1 \leq d \leq m \\ 0 & \text{otherwise} \end{cases}$$

MAX POOLING: $(X \in R^{m \times m \times p}) \to (Y \in R^{n \times n \times p})$
where
$$y_{i,j,k} = \max_{t=1}^{3} \max_{u=1}^{3} x_{c,d,k}$$
$c = 2(i-1) + t$
$d = 2(j-1) + u$ FULLY CONNECTED: $(x \in R^m) \to (y \in R^n)$
where
$y = (Wx + b)^+$
$W \in R^{n \times m}$
$b \in R^n$ SOFTMAX: $(x \in R^m) \to (z \in R^n)$
where
$$z_i = \frac{e^{y_i}}{\sum_{j=1}^{n} e^{y_j}}$$
$y = Wx + b$
$W \in R^{n \times m}$
$b \in R^n$ LOCAL RESPONSE NORMALIZATION: $(X \in R^{n \times n \times p}) \to (Y \in R^{n \times n \times p})$
where
$$y_{i,j,k} = \frac{x_{i,j,k}}{(1 + \alpha \sum_{l=l_{low}}^{l_{high}} (x_{i,j,l})^2)^\beta}$$
$\alpha = 0.00002$
$\beta = 0.75$
$$l_{low} = \begin{cases} k-1 & \text{if } k > 1 \\ 1 & \text{otherwise} \end{cases}$$
$$l_{high} = \begin{cases} k+1 & \text{if } k < p \\ p & \text{otherwise} \end{cases}$$

$$(x \in R)^+ = \begin{cases} x & \text{if } x > 0 \\ 0 & \text{otherwise} \end{cases}$$

FIG. 5B

TECHNIQUES FOR DEFINING AND EXECUTING PROGRAM CODE SPECIFYING NEURAL NETWORK ARCHITECTURES

BACKGROUND

Field of the Various Embodiments

Embodiments of the present disclosure relate generally to computer science and artificial intelligence and, more specifically, to techniques for defining and executing program code specifying neural network architecture.

Description of the Related Art

Neural networks can be trained to perform a wide range of tasks with a high degree of accuracy. Neural networks are therefore becoming widely adopted in the field of artificial intelligence. Neural networks can have a diverse range of network architectures. In more complex scenarios, the network architecture for a neural network can include many different types of layers with an intricate topology of connections among the different layers. For example, some neural networks can have ten or more layers, where each layer can include hundreds or thousands of neurons and can be coupled to one or more other layers via hundreds or thousands of individual connections.

During the neural network development process, a designer writes program code to create a neural network architecture that addresses a particular type of problem. The designer then trains the neural network using training data and target outputs that the neural network should produce when processing that training data. For example, the designer could train the neural network based on a set of images that display various landscapes along with labels indicating the types of landscapes shown in the set of images.

When writing program code for a neural network, designers oftentimes rely on one or more programming libraries that expose various tools that facilitate neural network design and the overall coding process. One drawback of using these types of programming libraries is that one or more complex software stacks usually have to be installed and executed in order to use the programming libraries. For example, to define a neural network, a developer may have to install several libraries, where each library has thousands of lines of code, even when much of the functionality exposed by those libraries goes unused when defining, training, and/or executing the neural network. Further, these complex software stacks are difficult to understand and master. Consequently, the pool of proficient neural network developers is limited to a small set of developers who have attained the requisite level of expertise in using the relevant complex software stacks. Further, complex software stacks, as a general matter, typically require significant computational and memory resources for proper execution. As a result, the pool of neural network developers is further limited to those who have access to more sophisticated hardware that meets those computational and memory requirements.

Another drawback of using conventional programming libraries when designing neural networks is that these programming libraries generally allow a designer to control only a limited number of neural network features. In particular, the programming libraries typically include layer definition functions that are rigid and impose limits on the types and parameters of neural network layers that can be defined. For example, some conventional programming libraries require a designer to specify explicitly which variables in a given layer of a neural network are learned during the training phase or have hard coded rules that permit only weight parameters of layers to be learned during the training phase. These types of constraints prevent developers from being creative and being able to explore a wide range of configurations when designing neural networks.

As an alternative to using conventional programming libraries, a designer may write code for a neural network using a traditional programming language, such as Python, C, C++, or Java. However, traditional programming language frameworks are not well-suited for defining and implementing mathematics-based operations easily, like those at the core of neural network architectures. As a result, a designer typically has to write large amounts of complex code that defines how each layer in the neural network operates, specifies how the various layers are coupled together, and delineates the various operations performed by the different layers. Further, variables that are learned during the training phase are unassigned when the code for a neural network is compiled. Conventional compilers for traditional programming languages issue errors when unassigned variables are encountered during compile time. To address these types of errors, a developer has to assign random values to the unassigned variables, which can introduce a built-in bias into the training phase and negatively impact the training process and/or the accuracy of the trained neural network As the foregoing illustrates, what is needed in the art are more effective techniques for defining neural networks.

SUMMARY

Various embodiments include a computer implemented method for generating an executable neural network. The method includes receiving source code that specifies a plurality of mathematical expressions that define one or more layers of a neural network, performing one or more compilation operations on a first mathematical expression included in the plurality of mathematical expression that include determining that a first variable included in the first mathematical expression is unassigned and, based on the first variable being unassigned, determining that the first variable is to be learned when the neural network is trained, and generating compiled code corresponding to the first mathematical expression that, when executed, causes a value for the first variable to be generated.

At least one technological advantage of the disclosed techniques relative to the prior art is that the disclosed AI design application can generate complex neural network architectures without requiring a designer user to write or interact with large amounts of program code. Another technological advantage of the disclosed techniques relative to the prior art is that the disclosed AI design application enables the designer to control any feature or aspect of the neural network architecture. In particular, a designer of a neural network defines the neural network as a series of mathematical operations and has full control over the specifics of the mathematical operations. Further, the AI design application automatically identifies which variables within a neural network architecture are to be learned during the training process without hard-coding rules or requiring the designer to explicitly identify those variables. Accordingly, the AI design application enables a designer to develop and better understanding of how the neural network operates.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 5A-5B are screenshots that illustrate how the network generation GUI of FIG. 3 facilitates generation of a neural network, according to various embodiments.

DETAILED DESCRIPTION

Figure 1:
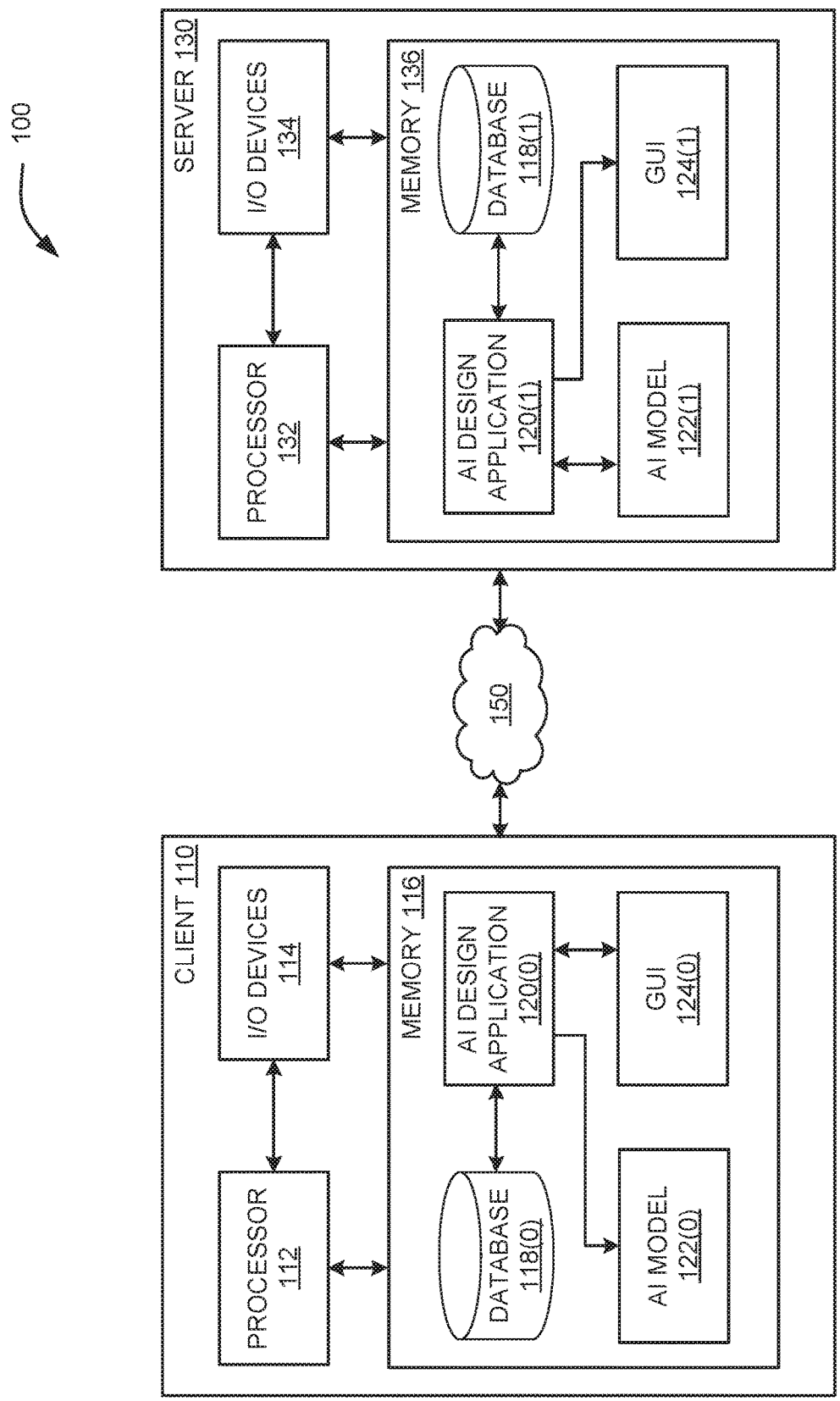
FIG. 1 illustrates a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

As noted above, deep neural networks can have complex network architectures that include numerous layers and intricate connection topologies. Consequently, a deep neural network can be difficult for a designer to generate. Further, once the deep neural network is generated, the complexity of the network architecture associated with the deep neural network can be difficult for the designer to analyze and understand. With a limited ability to analyze and understand the deep neural network, the designer can have further difficulty evaluating how well the deep neural network performs an intended task. Finally, lacking an explicit understanding of how the deep neural network operates, the designer cannot easily characterize the operation of the deep neural network or describe that operation to others.

To address these issues, various embodiments include an artificial intelligence (AI) design application that exposes various tools to a user for generating, analyzing, evaluating, and describing neural networks. The AI design application includes a network generator that generates and/or updates program code that defines a neural network based on user interactions with a graphical depiction of the network architecture. The network generator enables the user to define the neural network in a mathematics-based programming language. The compilation of source code created using the mathematics-based programming language includes several features that enable the efficient development of neural network architectures. The AI design application also includes a network analyzer that analyzes the behavior of the neural network at the layer level, neuron level, and weight level in response to test inputs. The AI design application further includes a network evaluator that performs a comprehensive evaluation of the neural network across a range of sample of training data. Finally, the AI design application includes a network descriptor that articulates the behavior of the neural network in natural language and constrains that behavior according to a set of rules.

At least one technological advantage of the disclosed techniques relative to the prior art is that the disclosed AI design application can generate complex neural network architectures without requiring a designer user to write or interact with large amounts of program code. Oftentimes, the amount of program code needed when generating a neural network architecture using the disclosed AI design application is orders of magnitude less than generating neural network architectures using conventional programming techniques. Another technological advantage of the disclosed techniques relative to the prior art is that the disclosed AI design application enables the designer to control any feature or aspect of the neural network architecture. In particular, a designer of a neural network defines the neural network as a series of mathematical operations and has full control over the specifics of the mathematical operations. Further, the AI design application automatically identifies which variables within a neural network architecture are to be learned during the training process without hard-coding rules or requiring the designer to explicitly identify those variables. Accordingly, the AI design application enables a designer to develop and better understanding of how the neural network operates.

System Overview

FIG. 1 illustrates a system configured to implement one or more aspects of the various embodiments. As shown, system 100 includes client 110 and server 130 coupled together via network 150. Client 110 or server 130 may be any technically feasible type of computer system, including a desktop computer, a laptop computer, a mobile device, a virtualized instance of a computing device, a distributed and/or cloud based computer system, and so forth. Network 150 may be any technically feasible set of interconnected communication links, including a local area network (LAN), wide area network (WAN), the World Wide Web, or the Internet, among others. Client 110 and server 130 are configured to communicate via network 150.

As further shown, client 110 includes processor 112, input/output (I/O) devices 114, and memory 116, coupled together. Processor 112 includes any technically feasible set of hardware units configured to process data and execute software applications. For example, processor 112 could include one or more central processing units (CPUs), one or more graphics processing units (GPUs), and/or one or more parallel processing units (PPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118(0), an artificial intelligence (AI) design application 120(0), an AI model 122(0), and a graphical user interface (GUI) 124(0). Database 118(0) is a file system and/or data storage application that stores various types of data. AI design application 120(0) is a software application that, when executed by processor 112, interoperates with a corresponding software application executing on server 130 to generate, analyze, evaluate, and describe one or more AI models. AI model 122(0) includes one or more artificial neural networks configured to perform general-purpose or specialized artificial intelligence-oriented operations. GUI 124(0) allows a user to interface with AI design application 120(0).

Server 130 includes processor 132, I/O devices 134, and memory 136, coupled together. Processor 132 includes any technically feasible set of hardware units configured to process data and execute software applications, such as one or more CPUs, one or more GPUs, and/or one or more PPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes database 118(1), AI design application 120(1), AI model 122(1), and GUI 124(1). Database 118(1) is a file system and/or data storage application that stores various types of data, similar to database 118(1). AI design application 120(1) is a software application that, when executed by processor 132, interoperates with AI design application 120(0) to generate, analyze, evaluate, and describe one or more AI models. AI model 122(1) includes one or more artificial neural networks configured to perform general-purpose or specialized artificial intelligence-oriented operations. GUI 124(1) allows a user to interface with AI design application 120(1).

As a general matter, database 118(0) and 118(1) represent separate portions of a distributed storage entity. Thus, for simplicity, databases 118(0) and 118(1) are collectively referred to herein as database 118. Similarly, AI design applications 120(0) and 120(1) represent separate portions of a distributed software entity that is configured to perform any and all of the inventive operations described herein. As such, AI design applications 120(0) and 120(1) are collectively referred to hereinafter as AI design application 120. AI models 122(0) and 122(1) likewise represent a distributed AI model that includes one or more neural networks. Accordingly, AI models 122(0) and 122(1) are collectively referred to herein as AI model 122. GUIs 124(0) and 124(1) similarly represent distributed portions of one or more GUIs. GUIs 124(0) and 124(1) are collectively referred to herein as GUI 124.

In operation, AI design application 120 generates AI model 122 based on user input that is received via GUI 124. GUI 124 exposes design and analysis tools that allow the user to create and edit AI model 122, explore the functionality of AI model 122, evaluate AI model 122 relative to training data, and generate various data describing and/or constraining the performance and/or operation of AI model 122, among other operations. Various modules within AI design application 120 that perform the above operations are described in greater detail below in conjunction with FIG. 2.

Figure 2:
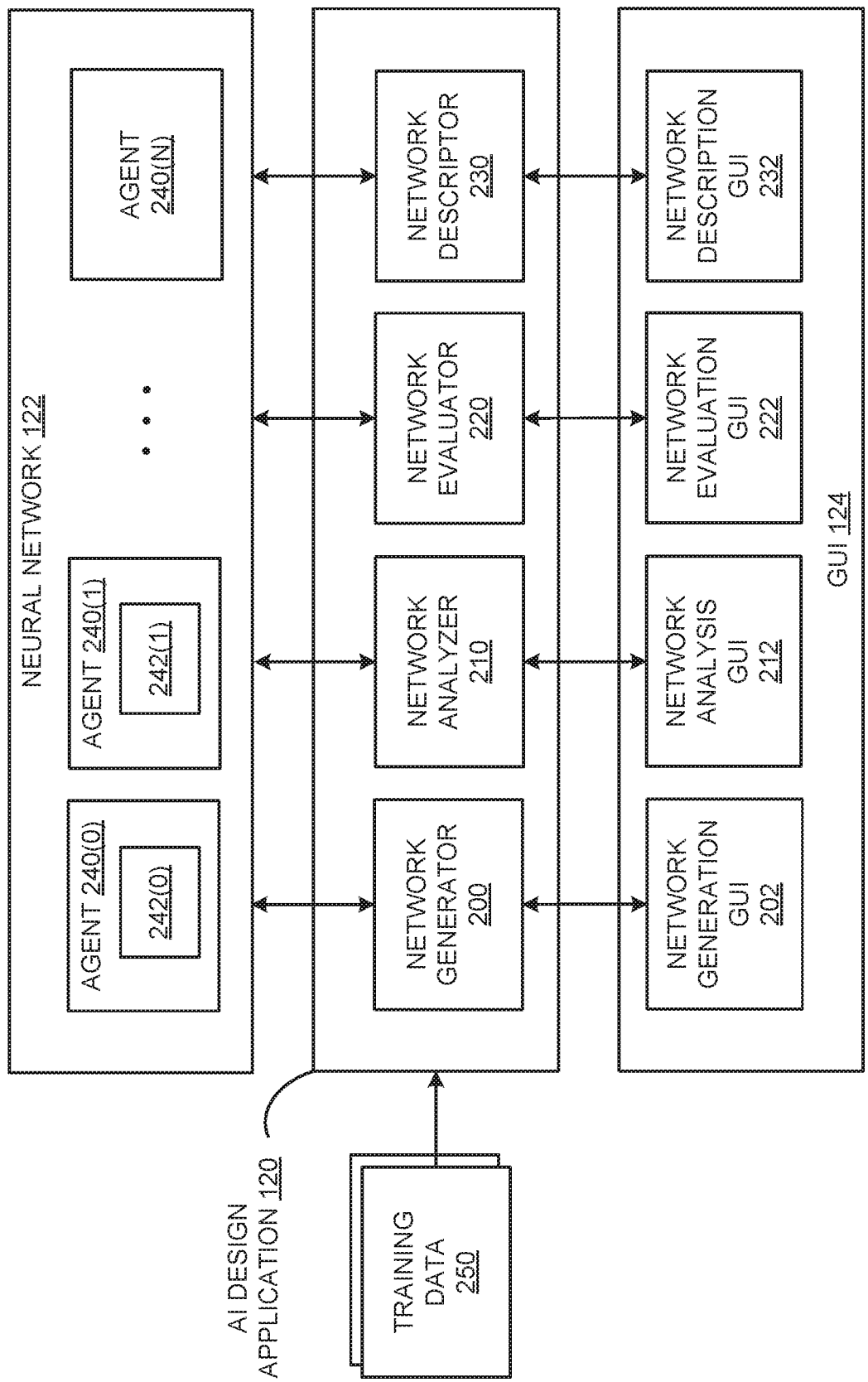
FIG. 2 is a more detailed illustration of the AI design application of FIG. 1, according to various embodiments.

FIG. 2 is a more detailed illustration of AI design application 120 of FIG. 1, according to various embodiments. As shown, AI design application 120 includes network generator 200, network analyzer 210, network evaluator 220, and a network descriptor 230. As also shown, AI model 122 includes one or more agents 240, and GUI 124 includes network generation GUI 202, network analysis GUI 212, network evaluation GUI 222, and network description GUI 232.

In operation, network generator 200 renders network generation GUI 202 to provide the user with tools for designing and connecting agents 240 within AI model 122. A given agent 240 may include a neural network 242 that performs various AI-oriented tasks. A given agent 240 may also include other types of functional elements that perform generic tasks. Network generator 200 trains neural networks 242 included in specific agents 240 based on training data 250. Training data 250 can include any technically feasible type of data for training neural networks. For example, training data 250 could include the Modified National Institute of Standards and Technology (MNIST) digits training set.

When training is complete, network analyzer 210 renders network analysis GUI 212 to provide the user with tools for analyzing and understanding how a neural network within a given agent 240 operates. In particular, network analyzer 210 causes network analysis GUI 212 to display various connections and weights within a given neural network 242 and to simulate the response of the given neural network 242 to various inputs, among other operations.

In addition, network evaluator 220 renders network evaluation GUI 222 to provide the user with tools for evaluating a given neural network 242 relative to training data 250. More specifically, network evaluator 220 receives user input via network evaluation GUI 222 indicating a particular portion of training data 250. Network evaluator 220 then simulates how the given neural network 242 responds to that portion of training data 250. Network evaluator 220 can also cause network evaluation GUI 222 to filter specific portions of training data 250 that cause the given neural network 242 to generate certain types of outputs.

In conjunction with the above, network descriptor 230 analyzes a given neural network 242 associated with an agent 240 and generates a natural language expression that describes the performance of the neural network 242 to the user. Network descriptor 230 can also provide various "common sense" facts to the user related to how the neural network 242 interprets training data 250. Network descriptor 230 outputs this data to the user via network description GUI 232. In addition, network descriptor 230 can obtain rule-based expressions from the user via network description GUI 232 and then constrain network behavior based on these expressions. Further, network descriptor 230 can generate metrics that quantify various aspects of network performance and then display these metrics to the user via network description GUI 232.

Referring generally to FIGS. 1-2, AI design application 120 advantageously provides the user with various tools for generating, analyzing, evaluating, and describing neural network behavior. The disclosed techniques differ from conventional approaches to generating neural networks, which generally obfuscate network training and subsequent operation from the user.

Figure 3:
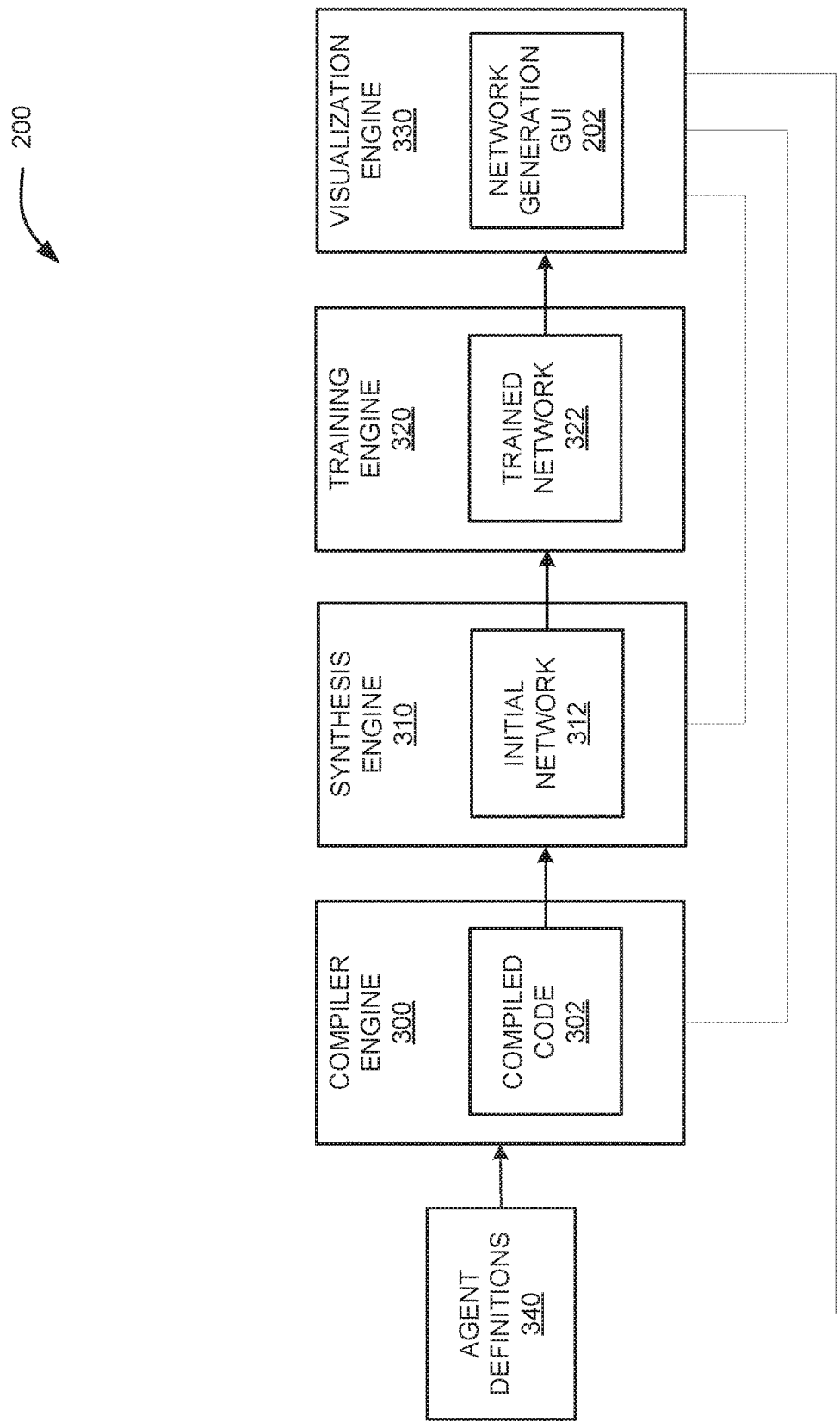
FIG. 3 is a more detailed illustration of the network generator of FIG. 2, according to various embodiments.

FIG. 3 is a more detailed illustration of the network generator of FIG. 1, according to various embodiments. As shown, network generator 200 includes compiler engine 300, synthesis engine 310, training engine 320, and visualization engine 330.

In operation, visualization engine 330 generates network generation GUI 202 and obtains agent definitions 340 from the user via network generation GUI 202. Compiler engine 300 compiles program code included in a given agent definition 340 to generate compiled code 302. Compiler engine 300 is configured to parse, compile, and/or interpret any technically feasible programming language, including C, C++, Python and associated frameworks, JavaScript and associated frameworks, and so forth. Synthesis engine 310 generates initial network 312 based on compiled code 302 and on or more parameters that influence how that code executes. Initial network 312 is untrained and may not perform one or more intended operations with a high degree of accuracy.

Training engine 320 trains initial network 312 based on training data 250 to generate trained network 322. Trained network 322 may perform the one or more intended operations with a higher degree of accuracy than initial network 312. Training engine 320 may perform any technically feasible type of training operation, including backpropagation, gradient descent, and so forth. Visualization engine 330 updates network generation GUI 202 in conjunction with the above operations to graphically depict the network architecture defined via agent definition 340 as well as to illustrate various performance attributes of trained network 322.

Mathematics-Based Programming and Execution of Neural Network Agents

As discussed above, in order to define and execute a neural network architecture, a developer typically uses cumbersome tools and libraries that are difficult to master and often obfuscate much of the details of the underlying network architecture. As a consequence, neural networks can be created only by a few set of developers who have expertise in the various tools and libraries. Further, because the underlying details of a network architecture are nested deep within the frameworks of the tools and libraries, a developer may not understand how the architecture functions or how to change or improve upon the architecture. To address these and other deficiencies in the neural network definition paradigm, a mathematics-based programming and execution framework for defining neural network architectures is discussed below.

In various embodiments, the source code for a neural network agent definition in a mathematics-based programming language is a pipeline of linked mathematical expressions. The source code is compiled into machine code without needing any intermediary libraries, where the machine code is representative of a trainable and executable neural network. In order for the neural network architecture to be defined in source code as a series of mathematical expressions, the mathematics-based programming language exposes several building blocks. These include a layer notation for specifying a layer of a neural network, a link notation for specifying a link between two or more layers of a neural network or two or more neural networks, a variable assignment notation for specifying a source of a variable (=), and various mathematical operation notations such as sum (+), division (/), summation (Σ), open and close parenthesis (( )), matrix definition, set membership (□), etc.

Each layer of a neural network is defined in the mathematics-based programming language as one or more mathematical expressions using the building blocks discussed above. For example, a convolution layer may be defined using the following source code that includes a set of mathematical expressions:

CONVOLUTION $(X \in R^{m \times m \times p}) \to (Y \in \mathbb{R}^{n \times n \times q})$ $$y_{i,j,k} = \left( \sum_{t=1}^{r} \sum_{u=1}^{r} \sum_{v=1}^{p} W_{t,u,v,k} a + b_k \right)^+$$

-continued $W \in \mathbb{R}^{r \times r \times p \times q}$ $b \in \mathbb{R}^q$ $r, s, z \in \mathbb{Z}$ $c = s(i-1) - z + t$ $d = s(j-1) - z + u$ $a = \begin{cases} x_{c,d,v} & \text{if } 1 \leq c \leq m \text{ and } 1 \leq d \leq m \\ 0 & \text{otherwise} \end{cases}$ In the above example, the first line of the source code indicates that the subsequent lines of the source code are related to a CONVOLUTION operation that has an input X and an output Y. The subsequent lines of the source code include a sequence of mathematical expressions that define the mathematical operations performed on the input X to generate the output Y. Each mathematical expression includes a right hand-side portion and a left-hand side portion. The right-hand side portion specifies a value that is determined when a mathematics operation specified by the left-hand portion is evaluated. For example, in the mathematical expression "c=s(i−1)−z+t" shown above, "c" is the right-handle portion and specifies that the variable c is assigned to the value generated when "s(i−1)−z+t" is evaluated.

The values of variables included in the source code of a neural network agent are either assigned when the neural network is instantiated or are learned during training of the neural network. Unlike other neural network definition paradigms, a developer of a neural network agent defined using the mathematics-based programming language has control over which variables are to be learned during training (referred to herein as "learned variables"). Further, the variables that are to be learned during training can remain uninitialized (i.e. without being assigned a value or a source of a value) even when the neural network is instantiated. The techniques for handling these learned variables during the compilation and training of a neural network are discussed below in detail in conjunction with FIGS. 4-6.

Figure 4:
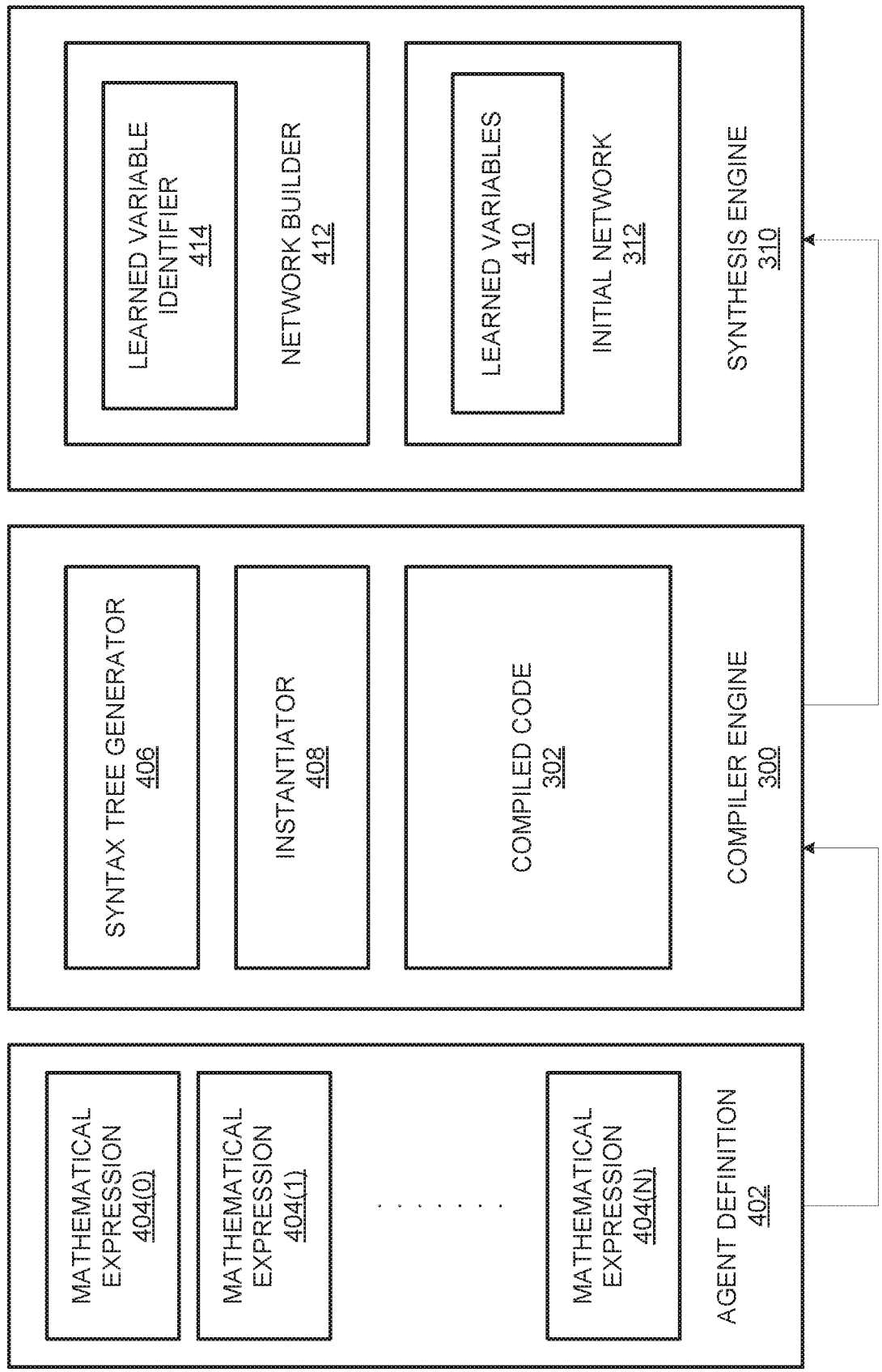
FIG. 4 is a more detailed illustration of the compiler engine and the synthesis engine of FIG. 3, according to various embodiments.

FIG. 4 is a more detailed illustration of compiler engine 300 and synthesis engine 310 of FIG. 3, according to various embodiments. As shown, compiler engine 300 includes syntax tree generator 406, instantiator 408, and compiled code 302. Synthesis engine 310 includes network builder 412 and initial network 312, which includes learned variables 410.

The operation of compiler engine 300 and synthesis engine 310 are described in conjunction with a given agent definition 402. The source code of agent definition 402 includes multiple layer specifications, where each layer specification includes one or more mathematical expressions 404 (individually referred to as mathematical expression 404) defined using the mathematics-based programming language. As discussed above, each mathematical expression 404 includes a right-hand side portion that specifies a value that is determined when a mathematics operation specified by the left-hand portion is evaluated. Mathematical expressions 404 may be grouped, such that each group corresponds to a different layer of a neural network architecture. The source code of agent definition 402 specifies the links between different groups of mathematical expressions 404.

Compiler engine 300 compiles the source code of agent definition 402 into compiled code 302. To generate compiled code 302, the compiler engine 300 includes syntax tree generator 406 and instantiator 408. Syntax tree generator 406 parses the source code of the agent definition 402 and generates an abstract syntax tree (AST) representation of the source code. In various embodiments, the AST representation includes a tree structure of nodes, where constants and variables are child nodes to parent nodes including operators or statements. The AST encapsulates the syntactical structure of the source code, i.e., the statements, the mathematical expressions, the variable, and the relationship between those contained within the source code.

Instantiator 408 processes the AST to generate compiled code 302. In operation, instantiator 408 performs semantic analysis on the AST, generates intermediate representations of the code, performs optimizations, and generates machine code that comprises compiled code 302. For the semantic analysis, instantiator 408 checks the source code for semantic correctness. In various embodiments, a semantic check determines whether variables and types included in the AST are properly declared and that the types of operators and objects match. In order to perform the semantic analysis, instantiator 408 instantiates all of the instances of a given object or function type that are included in the source code. Further, instantiator 408 generates a symbol table representing all the named objects—classes, variables, and functions—is created and used to perform the semantic check on the source code.

Instantiator 408 performs a mapping operation for each variable in the symbol table to determine whether the value of the variable is assigned to a source identified in the source code. Instantiator 408 flags the variables that do not have an assigned source as potential learned variables, i.e., the variables that are to be learned during the training process. In various embodiments, these variables do not have a special type indicating that the variables are learned variables. Further, the source code does not expressly indicate that the variables are learned variables. Instantiator 408 automatically identifies those variables as potential variables that are to be learned by virtue of those variables not being assigned to a source. Thus, instantiator 408 operates differently from traditional compilers and interpreters, which would not allow for a variable to be unassigned, undeclared, or otherwise undefined and raise an error during the compilation process.

Instantiator 408 transmits compiled code 302 and a list of potential learned variables to synthesis engine 310. As discussed above, synthesis engine 310 generates initial network 312 based on compiled code 302 and on or more parameters that influence how that compiled code 302 executes. In particular, network builder 412 analyzes the structure of the compiled code 302 to determine the different layers of the neural network architecture and how the outputs of a given layer are linked into inputs of one or more subsequent layers. In various embodiments, network builder 412 also receives, via user input for example, values for certain variables included in the compiled code.

Learned variable identifier 414 included in network builder 412 identifies learned variables 410 within initial network 312. In operation, learned variable identifier 414 analyzes the list of potential learned variables received from instantiator 408 in view of the structure of the layers of the neural network architecture determined by network builder 412 and any values for variables received by network builder 412. For each of the potential learned variables, learned variable identifier 414 determines whether the source of the potential learned variable in a given layer of the neural network architecture is an output from a prior layer of the neural network architecture. If such a source exists, then the potential learned variable is not a variable that is to be learned during training of the neural network. Similarly, learned variable identifier 414 determines whether a value for a potential learned variable has been expressly provided to network builder 412. If such a value has been provided, then the potential learned variable is not a variable that is to be learned during training of the neural network. In such a manner, learned variable identifier 414 processes each of the potential learned variables to determine whether the potential learned variable is truly a variable that is to be learned during training. Once all of the potential learned variables have been processed, learned variable identifier 414 identifies any of the potential learned variables for which a source was not determined. These variables make up learned variables 410 of initial network 312.

In various embodiments, learned variable identifier 414 causes the network generation GUI 202 to display learned variables 410 identified by learned variable identifier 414. Learned variables 410 can then be confirmed by or otherwise modified by a user of the GUI 202, such as the developer of the neural network architecture.

As discussed above, training engine 320 trains initial network 312 based on training data 250 to generate trained network 322. Trained network 322 includes values for the learned variables 410 that are learned during the training process. Trained network 322 may perform the one or more intended operations with a higher degree of accuracy than initial network 312. Training engine 320 may perform any technically feasible type of training operation, including backpropagation, gradient descent, and so forth.

Figure 5A:
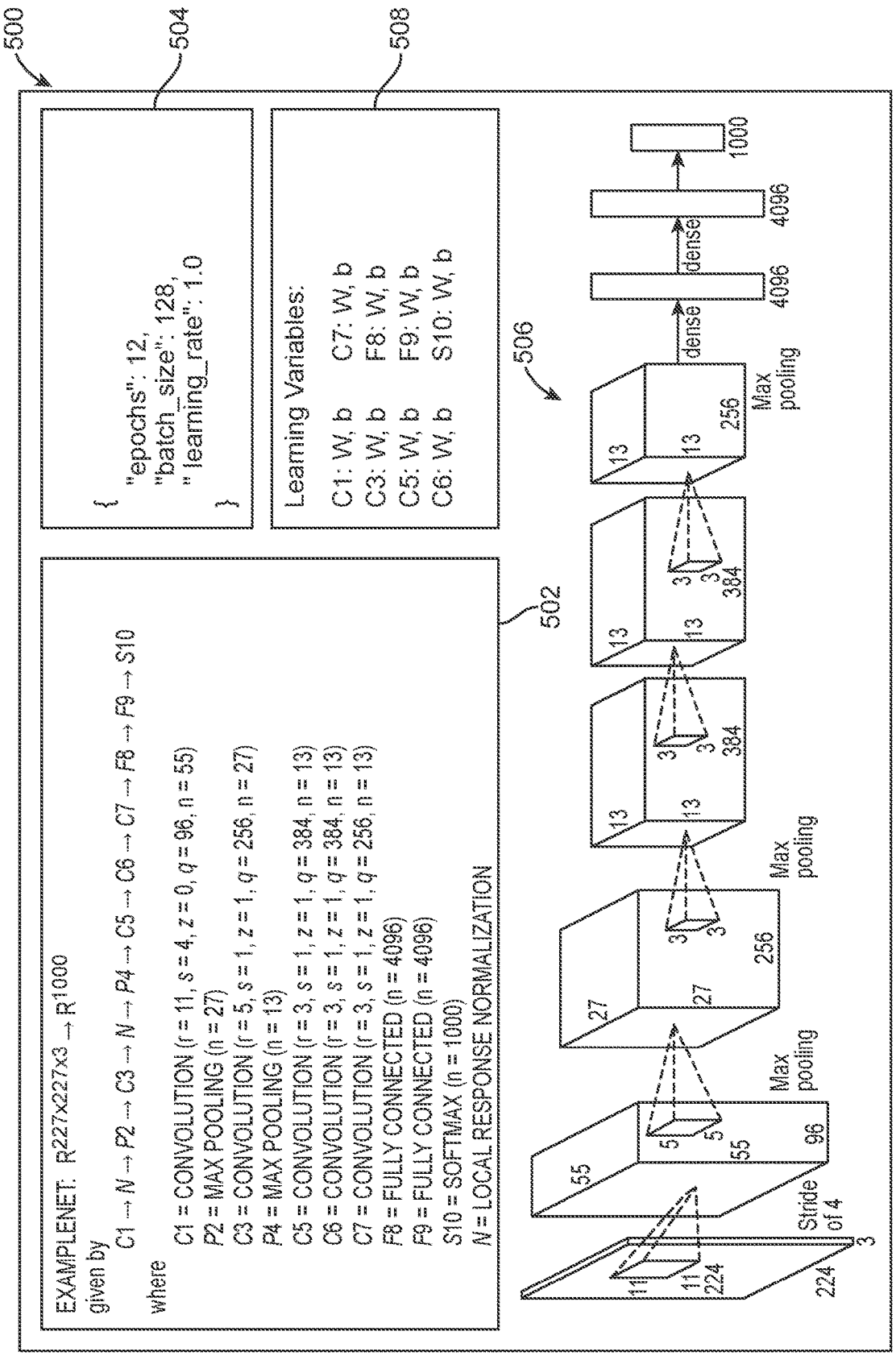

FIG. 5A is a screenshot that illustrates how the network generation GUI of FIG. 3 facilitates generation of a neural network, according to various embodiments. As shown, a GUI panel 500 includes model definition panel 502, hyperparameter panel 504, and learned variables panel 508. GUI panel 500 resides within network generation GUI 202.

Model definition panel 502 is a text field that obtains the source code of the network architecture from the user. For example, model definition panel 502 could receive source code that includes a series of mathematical expressions that define different layers of a neural network architecture. In one embodiment, model definition panel 502 exposes a portion of a network and omits other portions that do not need to be edited by the user, such as module imports, among others.

In the example shown, the model definition panel 502 includes a definition of a neural network, ExampleNet. As shown in the third line of the definition, ExampleNet includes a pipeline of ten layers: C1, N, P2, C3, N, P4, C5, C6, C7, F8, F9, and S10. Each of the ten layers is defined in the lines subsequent to the "where" clause. For example, C1 is defined as a Convolution layer, P2 is defined as MaxPooling layer, F8 is defined as FullyConnected layer, and S10 is defined as a Softmax layer. Each of these types of layers, Convolution, MaxPooling, FullyConnected, and Softmax, is associated with a series of mathematical expressions that are included in the source code.

FIG. 5B is a screenshot illustrating another portion of the model definition panel 502 that includes the mathematical expressions associated with each of the types of layers that are used in the network architecture of ExampleNet. Within these mathematical expressions, some variables are expressly assigned while others are learned variables that are unassigned. In particular, the variables W and b in the mathematical expressions for Convolution, FullyConnected, and Softmax are unassigned variables that are to be learned during training. As shown in FIG. 5B, the mathematical expressions including these learned variables do not have any express identification that these variables are to be learned. Instead, these learned variables are specified using standard mathematical notation.

Using the techniques discussed above in conjunction with FIG. 4, compiler engine 300 and synthesis engine 310 identify the learned variables when compiling the code for ExampleNet included in model definition panel 502. In the case of ExampleNet, because the variables W and b in the mathematical expressions for Convolution, FullyConnected, and Softmax are unassigned variables, compiler engine 300 and synthesis engine 310 identify the variables W and b in each of C1, C3, C5, C6, C7, F8, F9, and S10 as learned variables. Referring back to FIG. 5A, learned variables panel 508 displays the learned variables identified for Example-Net. A user may interact with learned variables panel 508 to edit the learned variables, for example, by adding additional learned variables and/or by deleting one or more identified learned variables.

Hyperparameter panel 504 is a text field that receives various hyperparameters that influence how the neural network is trained. For example, hyperparameter panel 504 could receive a number of training epochs and/or a learning rate from the user.

Network generator 200 implements the technique described above in conjunction with FIG. 3-4 to generate a neural network, such as those shown in FIG. 2, based on the description of the network architecture obtained from the user. Network generator 200 also updates GUI panel 500 to include network architecture 506. Network architecture 506 graphically depicts the type and arrangement of layers in the neural network and any other topological information associated with the neural network. In the example shown, network architecture 506 includes a visual representation of each of the ten layers of ExampleNet.

Network generator 200 is configured to dynamically modify the underlying neural network 242 defined in model definition panel 502 based on user interactions with network architecture 506. For example, network generator 200 could receive user input indicating that a particular portion of network architecture 506 should be modified. In response, network generator 200 modifies the underlying neural network and also updates the definition included in model definition panel 502 in a corresponding fashion. In addition, network generator 200 is configured to dynamically modify network architecture 506 based on user interactions with model definition panel 502. For example, GUI panel 500 could receive input indicating one or more changes to the description set forth in model definition panel 502. In response, network generator 200 modifies the underlying neural network and also updates network architecture 506 to reflect the changes. In various embodiments, network generator 200 operates within a web browser application such that any modifications in the model definition panel 502 are received via web browser interface. The modified description is recompiled within the execution framework of the web browser.

Network generator 200 can implement the above techniques via network generation GUI 202 in order to create and modify neural networks 242 included in agents 240. Network generator 200 can also define other types of agents that perform generic operations, as previously mentioned.

The above techniques provide the user with a convenient mechanism for creating and updating neural networks that are integrated into potentially complex AI models 122 that include numerous agents 240. Further, these techniques allow the user to modify program code that defines a given agent 240 via straightforward interactions with a graphical depiction of the corresponding network architecture. Network generator 200 performs the various operations described above based on user interactions conducted via network generation GUI 202. The disclosed techniques provide the user with convenient tools for designing and interacting with neural networks that expose network information to the user rather than allowing that information to remain hidden, as generally found with prior art techniques.

Figure 6:
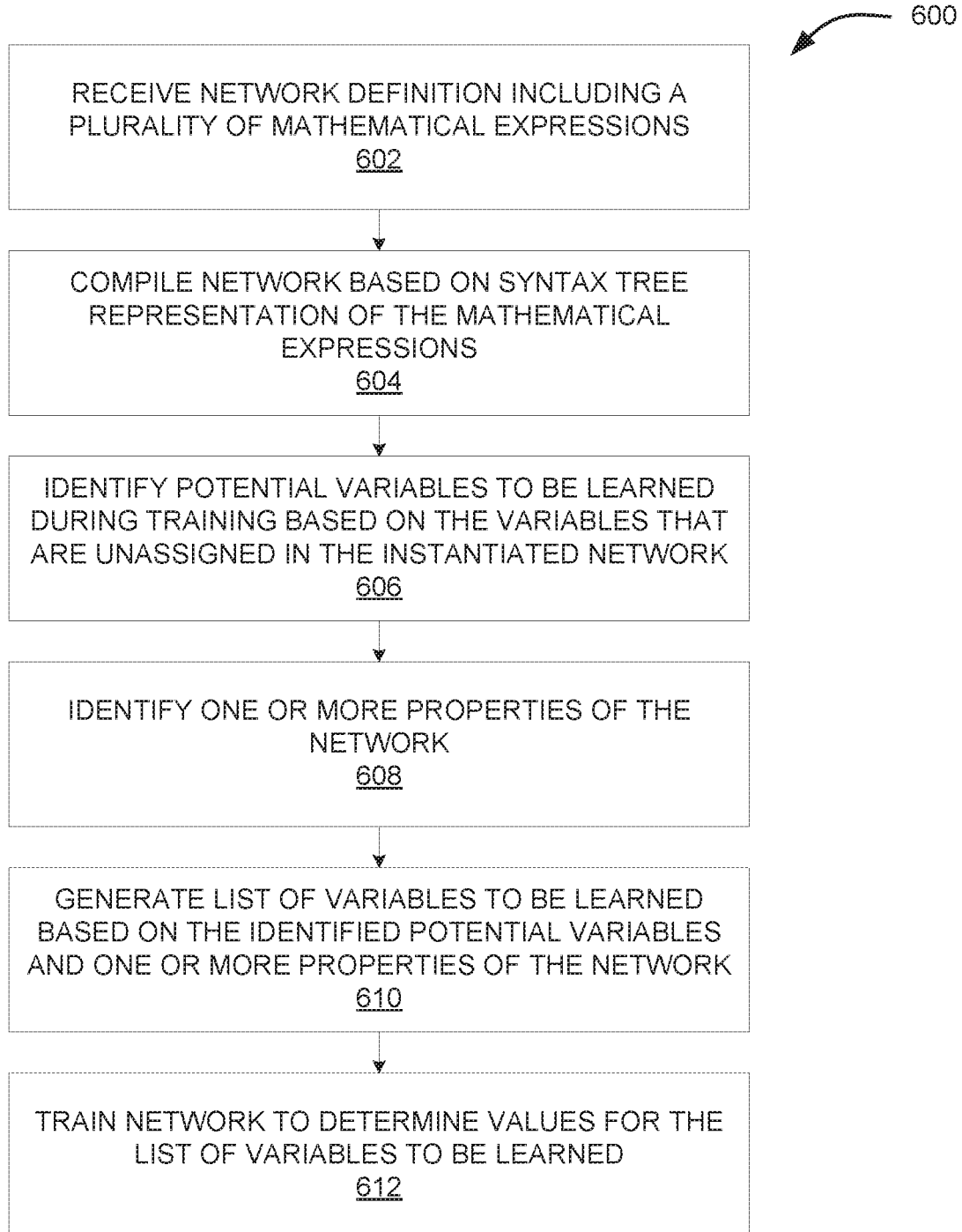
FIG. 6 is a flow diagram of method steps for defining and compiling a neural network in a mathematics-based programming language, according to various embodiments.

FIG. 6 is a flow diagram of method steps for defining and compiling a neural network in a mathematics-based programming language, according to various embodiments. Although the method steps are described in conjunction with the systems of FIGS. 1-5, persons skilled in the art will understand that any system configured to perform the method steps in any order falls within the scope of the present embodiments.

As shown, a method 600 begins at step 602, where compiler engine 300 receives source code for a neural network definition that includes a plurality of mathematical expressions. The source code includes multiple layer specifications, where each layer specification includes one or more mathematical expressions defined using a mathematics-based programming language. As discussed above, each mathematical expression includes a right-hand side portion that specifies a variable that is being assigned to a mathematical evaluation specified by the left-hand portion. Mathematical expressions may be grouped, such that each group corresponds to a different layer of a neural network architecture.

At step 604, compiler engine 300 compiles the neural network based on a syntax tree representation of the source code. The syntax tree representation encapsulates syntactical structure of the source code, i.e., the statements, the mathematical expressions, the variable, and the relationship between those contained within the source code. In operation, compiler engine 300 performs semantic analysis on the syntax tree representation, generates intermediate representations of the code, performs optimizations, and generates machine code that comprises compiled code 302. For the semantic analysis, compiler engine 300 checks the source code for semantic correctness. In various embodiments, compiler engine 300 generators a symbol table that identifies each of the variables included in the source code.

At step 606, compiler engine 300 identifies potential variables that are to be learned during training of the neural network based on the variables that are unassigned in the source code. In various embodiments, compiler engine 300 performs a mapping operation for each variable in the symbol table to determine whether the value of the variable is assigned to a source within the source code. Compiler engine flags the variables that do not have an assigned source as potential learned variables, i.e., the variables that need to be learned during the training process. In various embodiments, these variables do not have a special type indicating that the variables are learned variables. Further, the source code does not expressly indicate that the variables are learned variables.

At step 608, synthesis engine 310 determines one or more properties of the neural network. As discussed above, synthesis engine 310 generates initial network 312 based on compiled code and on or more parameters that influence how that compiled code 302 executes. In particular, synthesis engine analyzes the structure of the compiled code 302 to determine the different layers of the neural network architecture and how the outputs of a given layer are linked into inputs of one or more subsequent layers. In various embodiments, synthesis engine 310 also receives, via user input for example, values for certain variables included in the compiled code.

At step 610, synthesis engine 310 identifies a list of learned variables for the neural network based on the potential learned variables identified at step 606 and the properties of the neural network determined at step 608. In operation, synthesis engine 310 analyzes the potential learned variables received in view of the structure of the layers of the neural network architecture and any values for variables received by synthesis engine 310. For each of the potential learned variables, synthesis engine 310 determines whether the source of the potential learned variable in a given layer of the neural network architecture is an output from a prior layer of the neural network architecture. If such a source exists, then the potential learned variable is not a variable that is to be learned during training of the neural network. Similarly, synthesis engine 310 determines whether a value for a potential learned variable has been expressly provided. If such a value has been provided, then the potential learned variable is not a variable that is to be learned during training of the neural network. In such a manner, synthesis engine 310 processes each of the potential learned variables to determine whether the potential learned variable is truly a variable that is to be learned during training. Once all of the potential learned variables have been processed, synthesis engine 310 identifies any of the potential learned variables for which a source was not determined. These variables make up the list of learned variables generated at step 610.

At step 612, training engine 320 trains the neural network based on training data to determine values for the list of variables to be learned. Training engine 320 may perform any technically feasible type of training operation, including backpropagation, gradient descent, and so forth.

As a general matter, the techniques described above for generating and modifying neural networks allow users to design and modify neural networks much faster than conventional approaches permit. Among other things, network generator 200 provides simple and intuitive tools for performing complex tasks associated with network generation. Additionally, network generator 200 conveniently allows modifications made to a network architecture to be seamlessly propagated back to a corresponding agent definition. Once the network is trained in the manner described, network analyzer 210 performs various techniques for analyzing network functionality.

In sum, an artificial intelligence (AI) design application that exposes various tools to a user for generating, analyzing, evaluating, and describing neural networks. The AI design application includes a network generator that generates and/or updates program code that defines a neural network based on user interactions with a graphical depiction of the network architecture. The network generator enables a developer to define the neural network architecture using a pipeline of mathematical expressions that can be directly compiled without the need of a complex software stack. The compilation process allows for the variables to be learned during the training process to be left unassigned when the neural network is instantiated. In particular, the compiler identifies such unassigned variables as variables having values that will be determined during the training process. The AI design application also includes a network analyzer that analyzes the behavior of the neural network at the layer level, neuron level, and weight level in response to test inputs. The AI design application further includes a network evaluator that performs a comprehensive evaluation of the neural network across a range of sample of training data. Finally, the AI design application includes a network descriptor that articulates the behavior of the neural network in natural language and constrains that behavior according to a set of rules.

At least one technological advantage of the disclosed techniques relative to the prior art is that the disclosed AI design application can generate complex neural network architectures without requiring a designer user to write or interact with large amounts of program code. Another technological advantage of the disclosed techniques relative to the prior art is that the disclosed AI design application enables the designer to control any feature or aspect of the neural network architecture. In particular, a designer of a neural network defines the neural network as a series of mathematical operations and has full control over the specifics of the mathematical operations. Further, the AI design application automatically identifies which variables within a neural network architecture are to be learned during the training process without hard-coding rules or requiring the designer to explicitly identify those variables. Accordingly, the AI design application enables a designer to develop and better understanding of how the neural network operates.

1. Some embodiments include a computer implemented method for generating an executable neural network, the method comprising receiving source code that specifies a plurality of mathematical expressions that define one or more layers of a neural network, performing one or more compilation operations on a first mathematical expression included in the plurality of mathematical expressions, wherein the one or more compilation operations include determining that a first variable included in the first mathematical expression is unassigned and, based on the first variable being unassigned, determining that the first variable is to be learned when the neural network is trained, and generating compiled code corresponding to the first mathematical expression that, when executed, causes a value for the first variable to be generated.

2. The computer implemented method of clause 1, wherein the first variable is specified in a first portion of the first mathematical expression, and the one or more operations include instantiating the first mathematical expression based on a second portion of the first mathematical expression.

3. The computer-implemented method of any of clauses 1-2, wherein determining that the first variable is unassigned comprises determining whether a corresponding value for the first variable has been assigned after the first mathematical expression is instantiated.

4. The computer-implemented method of any of clauses 1-3, wherein determining that the first variable is to be learned during training is further based on a property of a first layer included in the one or more layers.

5. The computer-implemented method of any of clauses 1-4, wherein the property of the first layer comprises an assignment of an input of the first layer to an output of a second layer included in the one or more layers, wherein the input of the first layer is associated with the first variable.

6. The computer-implemented method of any of clauses 1-5, further comprising displaying the first variable in a learned variable user interface.

7. The computer-implemented method of any of clauses 1-6, wherein, prior to executing the compiled code, receiving a confirmation input via the learned variable user interface confirming that the first variable is to be learned during training.

8. The computer-implemented method of any of clauses 1-7, further comprising executing the compiled code in a training phase of the neural network in order to determine the value for the first variable.

9. The computer-implemented method of any of clauses 1-8, wherein the source code identifies a relationship between a first layer and a second layer included in the one or more layers.

10. The computer-implemented method of any of clauses 1-9, further comprising receiving an update to the source code within a web browser application and recompiling the updated source code within an execution framework of the web browser.

11. A computer readable medium storing instructions that, when executed by a processor, cause the processor to generate an executable neural network by performing the steps of receiving source code that specifies a plurality of mathematical expressions that define one or more layers of a neural network, performing one or more compilation operations on a first mathematical expression included in the plurality of mathematical expressions, wherein the one or more compilation operations include determining that a first variable included in the first mathematical expression is unassigned and, based on the first variable being unassigned, determining that the first variable is to be learned when the neural network is trained, and generating compiled code corresponding to the first mathematical expression that, when executed, causes a value for the first variable to be generated.

12. The computer readable medium of clause 11, wherein the first variable is specified in a first portion of the first mathematical expression, and the one or more operations include instantiating the first mathematical expression based on a second portion of the first mathematical expression.

13. The computer readable medium of any of clauses 11-12, wherein determining that the first variable is unassigned comprises determining whether a corresponding value for the first variable has been assigned after the first mathematical expression is instantiated.

14. The computer readable medium of any of clauses 11-13, wherein determining that the first variable is to be learned during training is further based on a property of a first layer included in the one or more layers.

15. The computer readable medium of any of clauses 11-14, wherein the property of the first layer comprises an assignment of an input of the first layer to an output of a second layer included in the one or more layers, wherein the input of the first layer is associated with the first variable.

16. The computer readable medium of any of clauses 11-15, further comprising displaying the first variable in a learned variable user interface.

17. The computer readable medium of any of clauses 11-16, wherein, prior to executing the compiled code, receiving a confirmation input via the learned variable user interface confirming that the first variable is to be learned during training.

18. The computer readable medium of any of clauses 11-17, further comprising executing the compiled code in a training phase of the neural network in order to determine the value for the first variable.

19. The computer readable medium of any of clauses 11-18, wherein generating the compiled code comprises compiling the first mathematical expression into machine-executable code.

20. Some embodiments include a system, comprising a memory storing a software application, and a processor that, when executing the software application, is configured to perform the steps of receiving source code that specifies a plurality of mathematical expressions that define one or more layers of a neural network, performing one or more compilation operations on a first mathematical expression included in the plurality of mathematical expressions, wherein the one or more compilation operations include determining that a first variable included in the first mathematical expression is unassigned and, based on the first variable being unassigned, determining that the first variable is to be learned when the neural network is trained, and generating compiled code corresponding to the first mathematical expression that, when executed, causes a value for the first variable to be generated.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating an executable neural network, the method comprising:
   receiving source code that specifies a plurality of mathematical expressions that define one or more layers of a neural network;
   performing one or more compilation operations on a first mathematical expression included in the plurality of mathematical expressions, wherein the one or more compilation operations include determining that a first variable included in the first mathematical expression is unassigned based on a value for the first variable not having an assigned source in the source code, and wherein the one or more compilation operations further include determining, based on the first variable being unassigned, that the value for the first variable is to be learned when the neural network is trained; and
   generating compiled code corresponding to the first mathematical expression that, when executed, causes the value for the first variable to be generated.

2. The computer-implemented method of claim 1, wherein the first variable is specified in a first portion of the first mathematical expression, and the one or more compilation operations include instantiating the first mathematical expression based on a second portion of the first mathematical expression.

3. The computer-implemented method of claim 2, wherein determining that the first variable is unassigned comprises determining whether the value for the first variable has been assigned after the first mathematical expression is instantiated.

4. The computer-implemented method of claim 1, wherein determining that the value for the first variable is to be learned during training is further based on a property of a first layer included in the one or more layers.

5. The computer-implemented method of claim 4, wherein the property of the first layer comprises an assignment of an input of the first layer to an output of a second layer included in the one or more layers, wherein the input of the first layer is associated with the first variable.

6. The computer-implemented method of claim 1, further comprising displaying the first variable in a learned variable user interface.

7. The computer-implemented method of claim 6, further comprising, prior to executing the compiled code, receiving a confirmation input via the learned variable user interface confirming that the value for the first variable is to be learned during training.

8. The computer-implemented method of claim 1, further comprising executing the compiled code in a training phase of the neural network in order to determine the value for the first variable.

9. The computer-implemented method of claim 1, wherein the source code identifies a relationship between a first layer and a second layer included in the one or more layers.

10. The computer-implemented method of claim 1, further comprising receiving an update to the source code within a web browser application and recompiling the updated source code within an execution framework of the web browser.

11. A non-transitory computer readable medium storing instructions that, when executed by a processor, cause the processor to generate an executable neural network by performing the steps of:
   receiving source code that specifies a plurality of mathematical expressions that define one or more layers of a neural network;
   performing one or more compilation operations on a first mathematical expression included in the plurality of mathematical expressions, wherein the one or more compilation operations include determining that a first variable included in the first mathematical expression is unassigned based on a value for the first variable not having an assigned source in the source code, and wherein the one or more compilation operations further include determining, based on the first variable being unassigned, that the value for the first variable is to be learned when the neural network is trained; and
   generating compiled code corresponding to the first mathematical expression that, when executed, causes the value for the first variable to be generated.

12. The non-transitory computer readable medium of claim 11, wherein the first variable is specified in a first portion of the first mathematical expression, and the one or more compilation operations include instantiating the first mathematical expression based on a second portion of the first mathematical expression.

13. The non-transitory computer readable medium of claim 12, wherein determining that the first variable is unassigned comprises determining whether the value for the first variable has been assigned after the first mathematical expression is instantiated.

14. The non-transitory computer readable medium of claim 11, wherein determining that value for the first variable is to be learned during training is further based on a property of a first layer included in the one or more layers.

15. The non-transitory computer readable medium of claim 14, wherein the property of the first layer comprises an assignment of an input of the first layer to an output of a second layer included in the one or more layers, wherein the input of the first layer is associated with the first variable.

16. The non-transitory computer readable medium of claim 11, the steps further comprising displaying the first variable in a learned variable user interface.

17. The non-transitory computer readable medium of claim 16, further comprising, prior to executing the compiled code, receiving a confirmation input via the learned variable user interface confirming that value for the first variable is to be learned during training.

18. The non-transitory computer readable medium of claim 11, the steps further comprising executing the compiled code in a training phase of the neural network in order to determine the value for the first variable.

19. The non-transitory computer readable medium of claim 11, wherein generating the compiled code comprises compiling the first mathematical expression into machine-executable code.

20. A system, comprising:
a memory storing a software application; and
a processor that, when executing the software application, is configured to perform the steps of:
receiving source code that specifies a plurality of mathematical expressions that define one or more layers of a neural network,
performing one or more compilation operations on a first mathematical expression included in the plurality of mathematical expressions, wherein the one or more compilation operations include determining that a first variable included in the first mathematical expression is unassigned based on a value for the first variable not having an assigned source in the source code, and wherein the one or more compilation operations further include determining, based on the first variable being unassigned, that the value for the first variable is to be learned when the neural network is trained, and
generating compiled code corresponding to the first mathematical expression that, when executed, causes the value for the first variable to be generated.

\* \* \* \* \*